US012587910B2

(12) United States Patent
Yang

(10) Patent No.: US 12,587,910 B2
(45) Date of Patent: Mar. 24, 2026

(54) METHOD FOR TIMER CONTROL, COMMUNICATION DEVICE, AND STORAGE MEDIUM

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 764 days.

(21) Appl. No.: 18/011,730

(22) PCT Filed: Jul. 23, 2020

(86) PCT No.: PCT/CN2020/103888
§ 371 (c)(1),
(2) Date: Dec. 20, 2022

(87) PCT Pub. No.: WO2022/016471
PCT Pub. Date: Jan. 27, 2022

(65) Prior Publication Data
US 2023/0319652 A1 Oct. 5, 2023

(51) Int. Cl.
| *H04W 36/36* | (2009.01) |
| *H04W 36/00* | (2009.01) |
| *H04W 36/24* | (2009.01) |
| *H04W 80/04* | (2009.01) |

(52) U.S. Cl.
CPC . *H04W 36/0019* (2023.05); *H04W 36/00837* (2018.08); *H04W 36/249* (2023.05); *H04W 80/045* (2013.01)

(58) Field of Classification Search
CPC ....... H04W 36/0019; H04W 36/00837; H04W 36/249; H04W 80/045
See application file for complete search history.

(56) References Cited

U.S. PATENT DOCUMENTS

| 10,542,475 | B1 | 1/2020 | Singh et al. | |
| 2021/0105674 | A1* | 4/2021 | Kim | H04W 74/0833 |
| 2022/0256425 | A1* | 8/2022 | Jia | H04W 36/26 |

FOREIGN PATENT DOCUMENTS

| CN | 110622616 A | 12/2019 |
| CN | 111345068 A | 6/2020 |
| CN | 111386728 A | 7/2020 |

OTHER PUBLICATIONS

Xiaomi: "Avoid consecutive CHO failure", 3GPP TSG-RAN WG2_RL2 R2-2001105, Feb. 13, 2020.
Chinese Office Action issued on Apr. 15, 2021 for Chinese Patent Application No. 202080001636.1.

(Continued)

*Primary Examiner* — Rafael Pérez-Gutiérrez
*Assistant Examiner* — Gilbert M Grant
(74) *Attorney, Agent, or Firm* — Volpe Koenig

(57) ABSTRACT

A method, communication device, and computer readable medium for data inactivity timer control in order to improve the reliability of data transmission. The reliability of the data transmission is improved by: determining an operation for starting a data inactivity timer according to whether a terminal is in a dual active protocol stack (DAPS) handover process in response to the occurrence of a data inactivity timer starting event.

17 Claims, 6 Drawing Sheets

Step 21, determine, in response to that a data inactivity timer starting event occurs, an operation for starting a data inactivity timer according to whether the terminal is in a dual active protocol stack (DAPS) handover process Step 22, wireless communication Step 31, not start a data inactivity timer or stop running of the data inactivity timer in response to that a data inactivity timer starting event occurs and a terminal is in a dual active protocol stack (DAPS) handover process Step 22, wireless communication

(56)         References Cited

OTHER PUBLICATIONS

Nokia, Nokia Shanghai Bell : "Summary of 6.9.3.2 Conditional
Handover Failure Handling" 3GPP TSG-RAN WG2 Meeting#109e
R2-2002016, Feb. 21, 2020.
NEC: "Handling of Expiry of DatalnactivityTimer during DAPS"
3GPP TSG-RAN WG2#110 electronic R2-2004787, May 22, 2020.

* cited by examiner

Step 21, determine, in response to that a data inactivity timer starting event occurs, an operation for starting a data inactivity timer according to whether the terminal is in a dual active protocol stack (DAPS) handover process Step 22, wireless communication Step 51, start a prohibit timer of a DAPS in response to that a terminal enters a DAPS handover process Step 52, start a data inactivity timer in response to that the prohibit timer exceeds a time-out value

Fig. 5

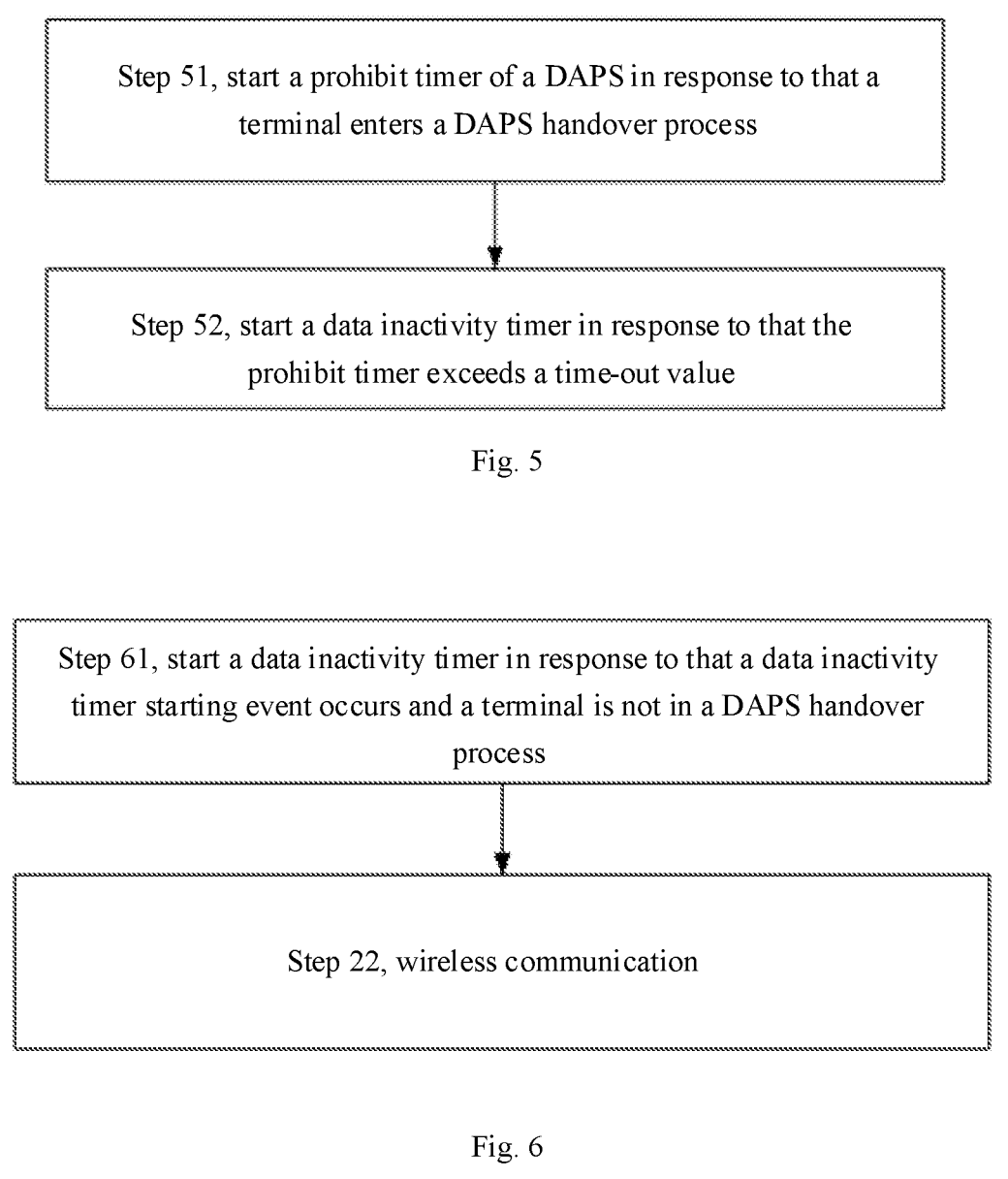

Step 61, start a data inactivity timer in response to that a data inactivity timer starting event occurs and a terminal is not in a DAPS handover process Step 22, wireless communication

Fig. 6

Step 61,  start a data inactivity timer in response to that a data inactivity timer starting event occurs and a terminal is not in a DAPS handover process Step 71, switch the terminal to a radio resource control (RRC) idle state in response to that a data inactivity timer starting event occurs and the data inactivity timer exceeds a time-out value

METHOD FOR TIMER CONTROL, COMMUNICATION DEVICE, AND STORAGE MEDIUM

CROSS REFERENCE TO RELATED APPLICATION

The present application is a U.S. National Stage of International Application No. PCT/CN2020/103888, filed on Jul. 23, 2020, the contents of all of which are incorporated herein by reference in their entirety for all purposes.

FIELD

The disclosure relates to but is not limited to the technical field of wireless communication, in particular to a method for data inactivity timer control and apparatus, a communication device, and a storage medium.

BACKGROUND

In a wireless communication network, cell handover is executed to support mobility of a terminal during moving between different cells. In a handover process, a terminal will cut off a radio resource control (RRC) connection with a source cell after receiving a handover instruction, initiates a random access procedure to a target cell and sends an RRC reconfiguration complete message to a target base station.

SUMMARY

According to a first aspect of the disclosure, a method for data inactivity timer control is provided. The method is performed by a terminal, and includes the following:

determining, in response to that a data inactivity timer starting event occurs, an operation for starting a data inactivity timer according to whether the terminal is in a dual active protocol stack (DAPS) handover process.

According to a second aspect of the disclosure, a communication device is provided. And the device includes:

a processor; and a memory configured to store instructions executable by the processor; in which the processor is configured to: implement the method described in any example of the disclosure when running the executable instructions.

According to a third aspect of the disclosure, a non-transitory computer storage medium is provided and stores a computer executable program, and the executable program, when being executed by a processor, implements the method described in any example of the disclosure.

BRIEF DESCRIPTION OF THE DRAWINGS

FIG. 5 is a flowchart of a data inactivity timer control method shown according to an example.

FIG. 6 is a flowchart of a data inactivity timer control method shown according to an example.

DETAILED DESCRIPTION

The examples will be described in detail here, and their instances are represented in the accompanying drawings. Unless otherwise indicated, when the following description refers to the accompanying drawings, the same number in the different accompanying drawings represents the same or similar elements. The implementations described in the following examples do not represent all implementations consistent with the examples of the disclosure. Rather, they are merely examples of an apparatus and method consistent with some aspects of the examples of the disclosure as detailed in appended claims.

Terms used in the examples of the disclosure are merely intended to describe specific examples instead of aiming at limiting the examples of the disclosure. The singular such as "a/an" and "the" used in the examples of the disclosure and appended claims also intends to include a plural form unless other meanings are clearly indicated in context. It needs to be further understood that a term "and/or" used here refers to and contains any one or all possible combinations of one or more associated listed items.

It needs to be understood that various information, possibly described by using terms such as first, second and third in the examples of the disclosure, are not supposed to be limited to these terms. These terms are merely used for distinguishing information of the same type. For example, without departing from the scope of the examples of the disclosure, first information may be also called second information, and similarly, the second information may also be called the first information. Depending on the context, a word "if" used here may be constructed as "during . . . ," "when . . . " or "in response to determining."

For the purpose of being concise and convenient to understand, when a size relation is described here, a term "greater than" or "smaller than" is used. But those skilled in the art can understand that based on a corresponding technical scenario and technical solution, the term "greater than" may also cover a meaning of "greater than or equal to," and the term "smaller than" may also cover a meaning of "smaller than or equal to."

Figure 1:
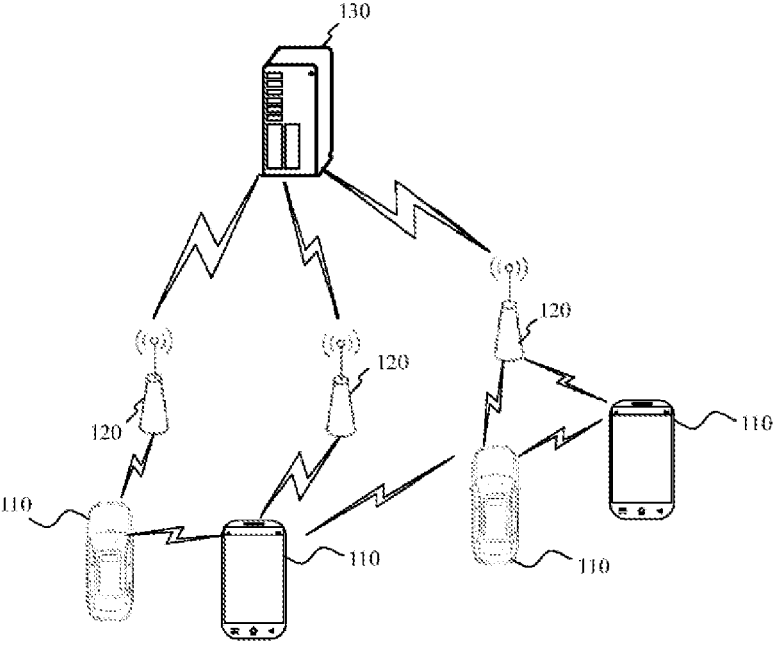
FIG. 1 is a schematic structural diagram of a wireless communication system according to an example.

Please refer to FIG. 1, which shows a schematic structural diagram of a wireless communication system provided by an example of the disclosure. As shown in FIG. 1, the wireless communication system is a communication system based on a cellular mobile communication technology and may include: a plurality of pieces of user equipment 110 and a plurality of base stations 120.

The user equipment 110 may refer to a device providing a voice and/or data connectivity for a user. The user equipment 110 may communicate with one or more core networks via a radio access network (RAN). The user equipment 110 may be Internet of Things user equipment, such as a sensor device, a mobile phone (or called a "cellular" phone) and a computer with the Internet of Things user equipment. For example, the user equipment may be a fixed, portable, pocket, hand-held, computer built-in, or vehicle-mounted apparatus. For example, the user equipment may be a station (STA), a subscriber unit, a subscriber station, a mobile station, a mobile, a remote station, an access point, a remote terminal, an access terminal, a user terminal, a user agent, a user device, or user equipment. Or the user equipment 110 may also be a device of an unmanned aerial vehicle. Or the user equipment 110 may also be a vehicle-mounted device. For example, the vehicle-mounted device may be a trip computer with a wireless communication function, or wireless user equipment externally connected with the trip computer. Or the user equipment 110 may also be a road-side infrastructure. For example, the road-side infrastructure may be a street lamp, signal lamp or other road-side infrastructures with a wireless communication function.

The base station 120 may be a network side device in the wireless communication system. The wireless communication system may be the 4th generation mobile communication (4G) system, also called a long term evolution (LTE) system; or the wireless communication system may also be a 5G system, also called a new radio (NR) system or a 5G NR system. Or the wireless communication system may also be a next generation system of the 5G system. An access network in the 5G system may be called a new generation-radio access network (NG-RAN).

The base station 120 may be an evolved base station (eNB) adopted in the 4G system. Or the base station 120 may also be a gNB adopting a centralized distributed architecture in the 5G system. When adopting the centralized distributed architecture, the base station 120 usually includes a central unit (CU) and at least two distributed units (DUs). Protocol stacks of a packet data convergence protocol (PDCP) layer, a radio link control (RLC) protocol layer and a media access control (MAC) layer are arranged in the central unit, a physical (PHY) layer protocol stack is arranged in the distributed units, and the examples of the disclosure do not limit a specific implementation of the base station 120.

A wireless connection may be established between the base stations 120 and the user equipment 110 through a wireless radio. In different implementations, the wireless radio is a wireless radio based on a 4th generation mobile communication network technology (4G) standard; or the wireless radio is a wireless radio based on a 5th generation mobile communication network technology (5G) standard, for example, the wireless radio is a new radio; or the wireless radio may also be a wireless radio based on a next generation mobile communication network technology standard of 5G.

In some examples, an end to end (E2E) connection may also be established between the user equipment 110. For example, there are scenarios of vehicle to vehicle (V2V) communication, vehicle to infrastructure (V2I) communication and vehicle to pedestrian (V2P) communication and the like in vehicle to everything (V2X) communication.

Here, the above user equipment may be regarded as a terminal device in the following examples.

In some examples, the above wireless communication system may also contain a network management device 130.

The plurality of base stations 120 are connected with the network management device 130, respectively. The network management device 130 may be a core network device in the wireless communication system. For example, the network management device 130 may be a mobility management entity (MME) in an evolved packet core (EPC). Or the network management device may also be other core network devices, for example, a serving gateway (SGW), a public data network gateway (PGW), a policy and charging rules function (PCRF) unit or a home subscriber server (HSS), etc. The examples of the disclosure do not limit an implementation form of the network management device 130.

In order to conveniently understand any example of the disclosure, first, a scenario of cell handover of a terminal is described.

In a wireless communication network, cell handover is executed to support mobility of a terminal during moving between different cells. In a handover process, a terminal will cut off a radio resource control (RRC) connection with a source cell after receiving a handover instruction, initiates a random access procedure to a target cell and sends an RRC reconfiguration complete message to a target base station. However, data transceiving of the terminal is interrupted before successfully establishing the radio resource control (RRC) connection with the target cell, which may lead to latency of services. In order to realize zero latency of the services in the handover process, a cell handover mode based on a dual active protocol stack (DAPS) is introduced. The terminal will remain the radio resource control (RRC) connection with the source cell after receiving a dual active protocol stack (DAPS) handover instruction and meanwhile initiates the random access procedure to the target cell. The target cell indicates the terminal to cut off the radio resource control (RRC) connection with the source cell after successfully establishing the radio resource control (RRC) connection with the target cell.

In an example, in dual active protocol stack (DAPS) handover, there are two media access control (MAC) entities in the terminal, and the two media access control (MAC) entities correspond to a source cell and a target cell, respectively. However, in a dual active protocol stack (DAPS), there is merely one radio resource control (RRC) state, after the dual active protocol stack (DAPS) handover is started, neither a radio link failure of the source cell nor a handover failure caused when handing over to the target cell triggers the terminal to perform radio resource control (RRC) connection reestablishment.

In an example, a minimum granularity of dual active protocol stack (DAPS) handover configuration is a bearer, namely, whether each bearer transmits data to the source cell and the target cell at the same time may be configured. Here, a network can carry the dual active protocol stack (DAPS) configuration merely in a handover instruction.

In an example, in order to improve the robustness of cell handover, the 5th generation mobile communication (5G) proposes a conditional handover (CHO), namely, a base station may configure a candidate cell capable of serving as the target cell and a handover trigger condition for the terminal in advance. When the handover trigger condition is met, the terminal initiates a cell handover by itself, a cell is selected among candidate cells to be used as the target cell for cell handover, and the base station does not need to send a cell handover instruction. The base station may configure one or a plurality of candidate cells capable of serving as the target cell and one or a plurality of handover trigger conditions for the terminal. In an example, the terminal may adopt cell handover triggered by the conditional handover (CHO) in a dual active protocol stack (DAPS) mode.

In an example, the terminal may reset media access control (MAC) information of the terminal specific to the source cell in the conditional handover at the same time. Here, the media access control (MAC) information includes information of a data inactivity timer, and the like. In the conditional handover, the data inactivity timer continues to run. When the data inactivity timer exceeds a time-out value, a context of the terminal is released, and the terminal enters the radio resource control (RRC) idle state. If the conditional handover is performed after the data inactivity timer exceeds a time-out value, a failure in the conditional handover may be caused inevitably, and if radio resource control (RRC) reestablishment is performed after the conditional handover fails, extra interruption may be caused.

Figure 2:
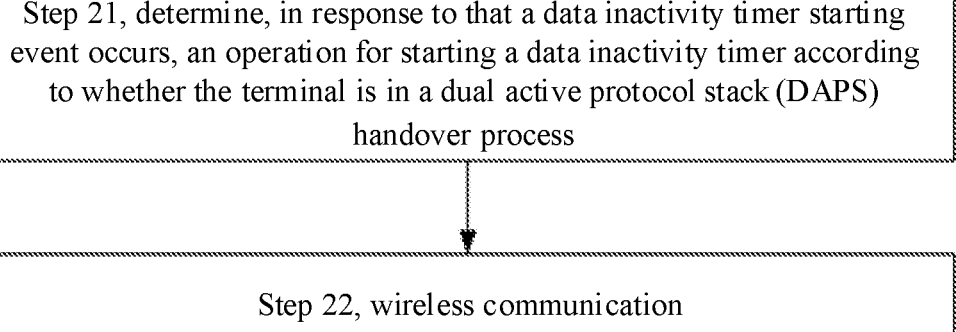
FIG. 2 is a flowchart of a data inactivity timer control method shown according to an example.

As shown in FIG. 2, an example provides a data inactivity timer control method, performed by a terminal and including step 21 and step 22.

In step 21, in response to that a data inactivity timer starting event occurs, an operation for starting a data inactivity timer is determined according to whether the terminal is in a dual active protocol stack (DAPS) handover process.

In step 22, wireless communication is performed.

In an example, the terminal may be but is not limited to a mobile phone, a wearable device, a vehicle-mounted terminal, a road side unit (RSU), a smart home terminal, an industrial sensing device, and/or a medical device and the like.

The base station is an interface device for connecting the terminal to a network. The base station may be various types of base stations, for example, a base station of a 3rd generation mobile communication (3G) network, a base station of a 4th mobile communication (4G) network, a base station of a 5th mobile communication (5G) or other evolved base stations.

In an example, the base station configures the data inactivity timer for the terminal, and when the data inactivity timer exceeds a time-out value, the terminal may release the radio resource control (RRC) connection.

In an example, in response to the data inactivity timer starting event occurring and it is not in the dual active protocol stack (DAPS) handover process, the data inactivity timer is started. In this way, when the data inactivity timer exceeds a time-out value, the terminal may release the radio resource control (RRC) connection in time. Thus, the terminal may enter the radio resource control (RRC) idle state in time, and a situation that the radio resource control (RRC) connection cannot be released on account of not correctly receiving a radio resource control (RRC) connection releasing message may be reduced. Power consumption of the terminal is lowered.

In an example, in response to the data inactivity timer starting event occurring and it is in the dual active protocol stack (DAPS) handover process, the data inactivity timer is not started. In this way, after the data inactivity timer is started in the dual active protocol stack (DAPS) handover process, radio resource control (RRC) connection interruption caused by a handover failure caused when the data inactivity timer, before releasing the source cell, exceeds a time-out value and triggers the terminal to enter the radio resource control (RRC) idle state can be reduced. Thus, the reliability of data transmission is improved.

In an example, starting the data inactivity timer may be initially starting the data inactivity timer or restarting the data inactivity timer. The data inactivity timer starting event includes: a data inactivity timer initial starting event and/or a data inactivity timer restarting event.

In an example, the data inactivity timer starting event includes at least one of the following:

a receiving event that a media access control (MAC) entity of the terminal receives a media access control (MAC) service data unit (SDU) on a dedicated transmission channel (DTCH), a dedicated control channel (DCCH) or a common control channel (CCCH); or
    a sending event that the media access control (MAC) entity of the terminal sends the media access control (MAC) service data unit (SDU) on the dedicated transmission channel (DTCH) or the dedicated control channel (DCCH).

In an example, in response to a terminal that is not in the dual active protocol stack (DAPS) handover process, when the media access control (MAC) entity of the terminal receives the media access control (MAC) service data unit (SDU) on the common control channel (CCCH), the dedicated control channel (DCCH) or the dedicated transmission channel (DTCH) or sends the media access control (MAC) service data unit (SDU) on the dedicated transmission channel (DTCH) or the dedicated control channel (DCCH), starting or restarting of the data inactivity timer may be triggered.

Here, in response to a media access control (MAC) layer that has not received the media access control (MAC) service data unit (SDU) on the common control channel (C), the dedicated control channel (DCCH) or the dedicated transmission channel (DTCH) nor sending of the media access control (MAC) service data unit (SDU) on the dedicated transmission channel (DTCH) or the dedicated control channel (DCCH), it may be determined that there is no data transceiving, so the data inactivity timer continuously performs timekeeping till the data inactivity timer exceeds a time-out value, and the radio resource control (RRC) connection is released. At the moment, the terminal may enter the radio resource control (RRC) idle state. In other words, in response to the terminal not being in the dual active protocol stack (DAPS) handover process, if there is no service data or control signaling for sending within a period of time, the terminal enters the radio resource control (RRC) idle state.

In an example, in response to the terminal being in the dual active protocol stack (DAPS) handover process, when the media access control (MAC) entity of the terminal receives the media access control (MAC) service data unit (SDU) on the common control channel (CCCH), the dedicated control channel (DCCH) or the dedicated transmission channel (DTCH), or sends the media access control (MAC) service data unit (SDU) on the dedicated transmission channel (DTCH) or the dedicated control channel (DCCH), starting or restarting of the data inactivity timer may not be triggered.

Here, in response to the media access control (MAC) layer has not received the media access control (MAC) service data unit (SDU) on the common control channel (CCCH), the dedicated control channel (DCCH) or the dedicated transmission channel (DTCH) nor sending of the media access control (MAC) service data unit (SDU) on the dedicated transmission channel (DTCH) or the dedicated control channel (DCCH), the data inactivity timer does not continuously perform timekeeping, and when the data inactivity timer exceeds a time-out value, the radio resource control (RRC) connection is released. In this way, in the dual active protocol stack (DAPS) handover process, radio resource control (RRC) connection interruption caused by the dual active protocol stack (DAPS) handover failure caused when the data inactivity timer exceeds a time-out value and the radio resource control (RRC) connection is released can be reduced.

In an example, the base station may determine in advance a candidate cell that can be used as the target cell during cell handover of the terminal, and send an instruction of a conditional handover (CHO) to the terminal. The instruction of the conditional handover (CHO) may carry information about the candidate cell capable of serving as the target cell and a cell handover trigger condition. Here, different cell handover trigger conditions may be set for different candidate cells correspondingly. When the handover trigger condition is met, the terminal initiates a handover process by itself, a cell is selected among the candidate cells to be used as the target cell for cell handover, and the base station does need to send a handover instruction. Here, the instruction of the conditional handover (CHO) may be carried in the configuration information.

In an example, the handover trigger condition includes a measurement event configured by the base station for the terminal. After the configuration is completed, the terminal measures corresponding information of the configured measurement event. When a measurement result meets a trigger condition of the measurement event, the terminal initiates the handover process by itself.

In an example, the measurement event may include at least one of the following: an event A1, an event A2, an event A3, an event A4, an event A5, an event B1 and an event B2. It needs to be noted that other measurement events may also be included, which is not limited here.

In an example, measurements executed by the terminal specific to the different measurement events are different. For example, in response to the base station (or the source cell, here, the source cell may be a cell providing a service for the terminal) configuring the event A1 for the terminal, the terminal needs to measure whether the signal quality of the source cell is higher than a first threshold, and in response to that the signal quality of the source cell is higher than the first threshold, a trigger condition of the event A1 is met. For another example, in response to the base station configuring the event A3 for the terminal, the terminal needs to measure whether corresponding signal quality of an adjacent cell of the source cell is higher than the signal quality of the source cell, and in response to that the corresponding signal quality of the adjacent cell is higher than the signal quality of the source cell, it is determined that a trigger condition of the event A3 is met.

In an example, the base station may configure a plurality of measurement events for the terminal. For example, the base station may configure the event A3 and the event A5 for the terminal. The event A3 is that the signal quality of the adjacent cell is higher than the signal quality of the source cell by a first set threshold. The event A5 is that the signal quality of the adjacent cell is higher than a third set threshold and the signal quality of the source cell is lower than the third set threshold.

In an example, the dual active protocol stack (DAPS) handover may be cell handover triggered by a conditional handover (CHO) mechanism in a dual active protocol stack (DAPS) mode. In an example, in response to the handover trigger condition of the conditional handover (CHO) is met, the terminal initiates a cell handover process by itself. Here, the cell handover process is performed based on the dual active protocol stack (DAPS). Here, the terminal, after receiving a dual active protocol stack (DAPS) handover instruction, remains a connection with the source cell and meanwhile initiates a random access procedure to the target cell. After successfully establishing the connection with the target cell, the target cell indicates the terminal to cut off the radio resource control (RRC) connection with the source cell. In this way, service latency caused by data transceiving interruption of the terminal before successfully establishing the connection with the target cell is reduced.

In an example, the terminal not being in the dual active protocol stack (DAPS) handover process may be the terminal not being configured with a dual active protocol stack (DAPS) bearer.

In an example, the terminal is in the dual active protocol stack (DAPS) handover process may be the terminal being configured with the dual active protocol stack (DAPS) bearer.

In response to that a prohibit timer of the dual active protocol stack (DAPS) exceeds a time-out value, it is determined that the terminal is not in the dual active protocol stack (DAPS) handover process, in which the dual active protocol stack (DAPS) handover process is executed within a timing range of the prohibit timer.

Here, when the prohibit timer exceeds a time-out value, the terminal does not perform the dual active protocol stack (DAPS) handover any more, so the terminal is not in the dual active protocol stack (DAPS) handover process currently.

In an example, configuring the bearer may be establishing a channel for data transmission between the terminal and the base station. Here, the bearer may be the minimum granularity configured for the dual active protocol stack (DAPS) handover.

In an example, whether each bearer transceives data to and from the source cell and the target cell at the same time may be configured. Here, the base station may carry a configuration parameter of the dual active protocol stack (DAPS) in the handover instruction.

In an example, the configuration parameter may include a scenario parameter. Here, the scenario parameter may be used for indicating an application scenario in which the cell handover is performed in the dual active protocol stack (DAPS) mode. In an example, the scenario parameter includes at least one of the following: a threshold value used for indicating a channel state of a serving cell of the terminal corresponding to the application scenario; and a service identifier used for indicating a corresponding service of the application scenario. In an example, the service identity includes one of the following: a logic channel identifier, a Quality of Service flow identifier or a Quality of Service identifier.

In an example, the dual active protocol stack (DAPS) handover may be the cell handover triggered by the conditional handover (CHO) mechanism in the dual active protocol stack (DAPS). Here, the terminal not performing the cell handover in the dual active protocol stack (DAPS) mode may not be meeting the trigger condition triggered by the conditional handover (CHO) mechanism. For example, the event A3 and the event A5 do not occur, and the like.

In an example, the terminal not being configured with the dual active protocol stack (DAPS) bearer may not be establishing the channel for data transmission between the terminal and the base station. The terminal cannot transmit data between the terminal and the serving base station and between the terminal and the target base station at the same time.

Here, the prohibit timer may be a timer T304. In an example, the prohibit timer is started when the cell handover is performed, in response to the terminal cannot completing the dual active protocol stack (DAPS) handover process within a set timing duration of the prohibit timer, a corresponding resource fallback may be performed, and a radio resource control (RRC) connection reestablishment process is initiated. Here, the resource fallback may be to make the terminal reestablish the radio resource control (RRC) connection with an original cell. For example, the terminal initiates the cell handover from a cell A to a cell B in the dual active protocol stack (DAPS) mode, but cannot complete the dual active protocol stack (DAPS) handover process within the timing duration of the prohibit timer, so the terminal reestablishes the radio resource control (RRC) connection with the cell A.

In an example, the dual active protocol stack (DAPS) handover failure oriented to the target cell is judged by time exceeding the timer T304. In response to the timer T304 exceeding a time-out value, the terminal will fall back to the source cell and resume the radio resource control (RRC) connection with the source cell.

In an example, the timing range may be a preset duration. In an example, in response to a demand for latency of the service that is higher than a set latency threshold, the preset duration is set to be larger than a duration threshold. In response to the demand for latency of the service that is lower than the set latency threshold and the preset duration is set to be less than the duration threshold.

In the example, in response to that a data inactivity timer starting event occurs, the terminal may determine an operation for starting a data inactivity timer according to whether the terminal is in the dual active protocol stack (DAPS) handover process. Compared with a mode that the data inactivity timer is started no matter if the terminal is in the dual active protocol stack (DAPS) handover process when the data inactivity timer starting event occurs, after the data inactivity timer is started in the dual active protocol stack (DAPS) handover process, radio resource control (RRC) connection interruption caused by a handover failure caused when the data inactivity timer, before releasing the source cell, exceeds a time-out value and triggers the terminal to enter the radio resource control (RRC) idle state can be reduced. Thus, reliability of data transmission is improved.

Figure 3:
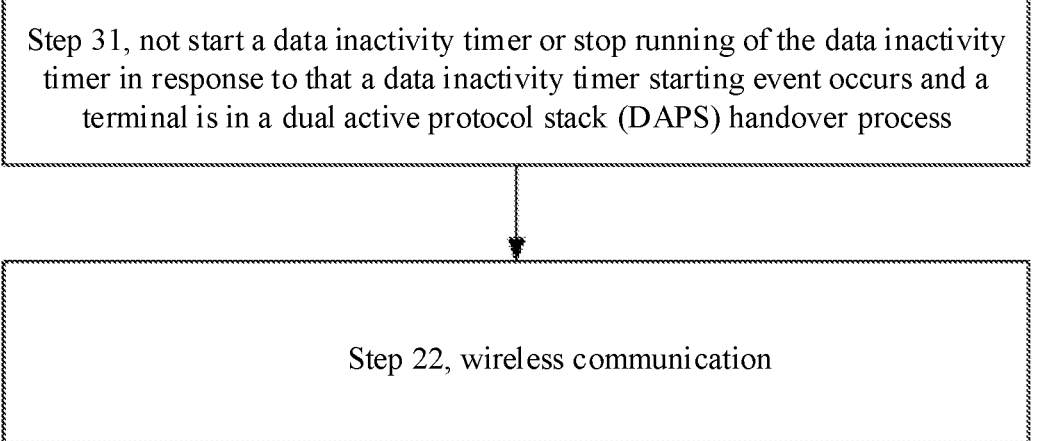
FIG. 3 is a flowchart of a data inactivity timer control method shown according to an example.

As shown in FIG. 3, an example provides a data inactivity timer control method, in step 21, determining, in response to the data inactivity timer starting event occurring, the operation for starting the data inactivity timer according to whether the terminal is in the dual active protocol stack (DAPS) handover process, includes step 31.

In step 31, in response to that the data inactivity timer starting event occurs and the terminal is in the dual active protocol stack (DAPS), the data inactivity timer is not started or stops running.

In an example, the terminal is in the dual active protocol stack (DAPS) handover process may be the terminal being configured with a dual active protocol stack (DAPS) bearer.

In an example, not starting the data inactivity timer may be not initially starting the data inactivity timer or not restarting the data inactivity timer.

In an example, stopping the running of the data inactivity timer may be stopping the timing of the data inactivity timer. Here, stopping the data inactivity timer may be stopping the timing of the data inactivity timer in a timekeeping process of the data inactivity timer.

In an example, in response to the terminal that is configured with the dual active protocol stack (DAPS) bearer, when a media access control (MAC) entity of the terminal receives a media access control (MCU) service data unit (SDU) on a common control channel (CCCH), a dedicated control channel (DCCH) or a dedicated transmission channel (DTCH) or sends the media access control (MAC) service data unit (SDU) on the dedicated transmission channel (DTCH) or the dedicated control channel (DCCH), starting of the data inactivity timer may not be triggered.

Here, in response to a media access control (MAC) layer not receiving the media access control (MAC) service data unit (SDU) on the common control channel (CCCH), the dedicated control channel (DCCH) or the dedicated transmission channel (DTCH) nor sending of the media access control (MAC) service data unit (SDU) on the dedicated transmission channel (DTCH) or the dedicated control channel (DCCH), the data inactivity timer does not continuously perform timekeeping, and when the data inactivity timer exceeds a time-out value, the radio resource control (RRC) connection is released. In this way, in the dual active protocol stack (DAPS) handover process, radio resource control (RRC) connection interruption caused by a dual active protocol stack (DAPS) handover failure caused when the data inactivity timer exceeds a time-out value and the radio resource control (RRC) connection is released can be reduced.

In an example, in response to the data inactivity timer that is in timekeeping when the terminal enters the dual active protocol stack (DAPS) handover process, the data inactivity timer stops running.

Here, in response to the data inactivity timer that is in timekeeping when the terminal enters the dual active protocol stack (DAPS) handover process, the data inactivity timer may stop running in time. In this way, in the dual active protocol stack (DAPS) handover process, radio resource control (RRC) connection interruption caused by a dual active protocol stack (DAPS) handover failure caused when the data inactivity timer exceeds a time-out value and the radio resource control (RRC) connection is released can be reduced.

Figure 4:
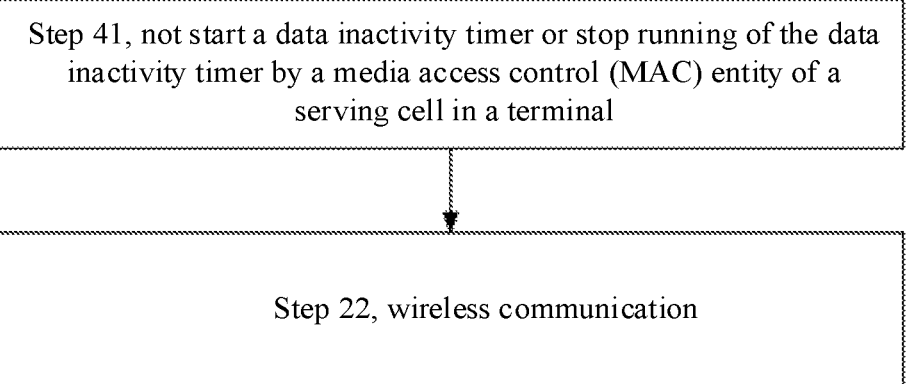
FIG. 4 is a flowchart of a data inactivity timer control method shown according to an example.

As shown in FIG. 4, an example provides a data inactivity timer control method, in step 31, not starting the data inactivity timer or stopping the running of the data inactivity timer, includes step 41.

In step 41, a media access control (MAC) entity of a serving cell in the terminal does not start the data inactivity timer or stop the running of the data inactivity timer.

Here, the serving cell may be a cell into which the terminal is connected currently.

In an example, the media access control (MAC) entity of the serving cell in the terminal not starting the data inactivity timer may be the media access control (MAC) entity of the serving cell in the terminal not initially starting the data inactivity timer or not restarting the data inactivity timer.

In an example, the media access control (MAC) entity of the serving cell in the terminal stopping the running of the data inactivity timer may be stopping the timing of the data inactivity timer. Here, the media access control (MAC) entity of the serving cell in the terminal stopping the data inactivity timer may be the media access control (MAC) entity of the serving cell in the terminal stopping the timing of the data inactivity timer during timekeeping of the data inactivity timer.

As shown in FIG. 5, an example provides a data inactivity timer control method, and the method further includes step 51.

In step 51, in response to that the terminal enters the DAPS handover process, a prohibit timer of a DAPS is started.

In step 31, after not starting the data inactivity timer or stopping the running of the data inactivity timer in response to that the data inactivity timer starting event occurs and the terminal is in the DAPS handover process, the method further includes step 52.

In step 52, the data inactivity timer is started in response to that the prohibit timer exceeds a time-out value.

Here, the prohibit timer may be a timer T304. In an example, the prohibit timer is started when the terminal enters the dual active protocol stack (DAPS) handover process, and in response to the terminal that cannot complete the dual active protocol stack (DAPS) handover process within a set timing duration of the prohibit timer, a corresponding resource fallback is performed, and a radio resource control (RRC) connection reestablishment process is initiated.

In an example, a dual active protocol stack (DAPS) handover failure oriented to the target cell is judged by time exceeding the timer T304. In response to the timer T304 that exceeds a time-out value, the dual active protocol stack (DAPS) handover process may be stopped, the terminal may fall back to the source cell and resume the radio resource control (RRC) connection with the source cell.

In an example, in response to the prohibit timer that exceeds a time-out value, when a media access control (MAC) entity of the terminal receives a media access control (MAC) service data unit (SDU) on a common control channel (CCCH), a dedicated control channel (DCCH) or a dedicated transmission channel (DTCH), or sends the media access control (MAC) service data unit (SDU) on the dedicated transmission channel (DTCH) or the dedicated control channel (DCCH), starting or restarting of the data inactivity timer may be triggered.

Here, when a media access control (MAC) layer has no receiving of the media access control (MAC) service data unit (SDU) on the common control channel (CCCH), the dedicated control channel (DCCH) or the dedicated transmission channel (DTCH) nor sending of the media access control (MAC) service data unit (SDU) on the dedicated transmission channel (DTCH) or the dedicated control channel (DCCH), it may be determined that there is no data transceiving, so the data inactivity timer continuously performs timekeeping till the data inactivity timer exceeds a time-out value, and the radio resource control (RRC) connection is released. At the moment, the terminal enters a radio resource control (RRC) idle state. In other words, in response to the terminal that is not in the dual active protocol stack (DAPS) handover process, if there is no service data or control signaling for sending within a period of time, the terminal enters the radio resource control (RRC) idle state.

As shown in FIG. 6, an example provides a data inactivity timer control method. In step 21, determining, in response to the data inactivity timer starting event that occurs, the operation for starting the data inactivity timer according to whether the terminal is in the dual active protocol stack (DAPS) handover process, includes step 61.

In step 61, in response to that the data inactivity timer starting event occurs and the terminal is not in the DAPS handover process, a data inactivity timer is started.

In an example, starting the data inactivity timer may be initially starting the data inactivity timer or restarting the data inactivity timer.

In an example, the terminal not being in the dual active protocol stack (DAPS) handover process may be the terminal not being configured with the dual active protocol stack (DAPS) bearer.

In response to a prohibit timer of a dual active protocol stack (DAPS) that exceeds a time-out value, it is determined that the terminal is not in the dual active protocol stack (DAPS) handover process, in which the dual active protocol stack (DAPS) handover process is executed within a timing range of the prohibit timer.

In an example, configuring the bearer may be establishing a channel for data transmission between the terminal and a base station. Here, the bearer may be a minimum granularity configured for the dual active protocol stack (DAPS) handover. In an example, whether each bearer transceives data to and from the source cell and the target cell at the same time may be configured.

In an example, the dual active protocol stack (DAPS) handover may be a cell handover triggered by a conditional handover (CHO) mechanism in a dual active protocol stack (DAPS). Here, the terminal not performing the cell handover in the dual active protocol stack (DAPS) mode may not be meeting a trigger condition triggered by the conditional handover (CHO) mechanism. For example, an event A3 and an event A5 does not occur, and the like.

In an example, the terminal not being configured with the dual active protocol stack (DAPS) bearer may not be establishing a channel for data transmission between the terminal and a base station. The terminal cannot transmit data between the terminal and a serving base station and between the terminal and a target base station at the same time.

Here, the prohibit timer may be a timer T304. In an example, the prohibit timer is started when a cell handover is performed, in response to the terminal that cannot complete the dual active protocol stack (DAPS) handover process within a set timing duration of the prohibit timer, a corresponding resource fallback may be performed, and a radio resource control (RRC) connection reestablishment process is initiated.

In an example, a dual active protocol stack (DAPS) handover failure oriented to the target cell is judged by time exceeding of the timer T304. In response to the timer T304 that exceeds a time-out value, the terminal may fall back to the source cell and resume a radio resource control (RRC) connection with the source cell.

In an example, a timing range may be a set duration range. In an example, in response to that a demand for latency of a service is higher than a set latency threshold, the duration range larger than a set duration is set. In response to the demand for latency of the service that is lower than the set latency threshold, a duration range less than the set duration is set.

In an example, in response to the terminal that is not in the dual active protocol stack (DAPS) handover process, when a media access control (MAC) entity of the terminal receives a media access control (MAC) service data unit (SDU) on a common control channel (CCCH), a dedicated control channel (DCCH) or a dedicated transmission channel (DTCH), or sends the media access control (MAC) service data unit (SDU) on the dedicated transmission channel (DTCH) or the dedicated control channel (DCCH), starting or restarting of the data inactivity timer may be triggered.

Here, when a media access control (MAC) layer has no receiving of the media access control (MAC) service data unit (SDU) on the common control channel (CCCH), the dedicated control channel (DCCH) or the dedicated transmission channel (DTCH) nor sending of the media access control (MAC) service data unit (SDU) on the dedicated transmission channel (DTCH) or the dedicated control channel (DCCH), it may be determined that there is no data transceiving, so the data inactivity timer continuously performs timekeeping till the data inactivity timer exceeds a time-out value, and the radio resource control (RRC) connection is released. At the moment, the terminal enters a radio resource control (RRC) idle state. In other words, in response to the terminal that is not in the dual active protocol stack (DAPS) handover process, if there is no service data or control signaling for sending within a period of time, the terminal enters the radio resource control (RRC) idle state.

Figures 7, 8:
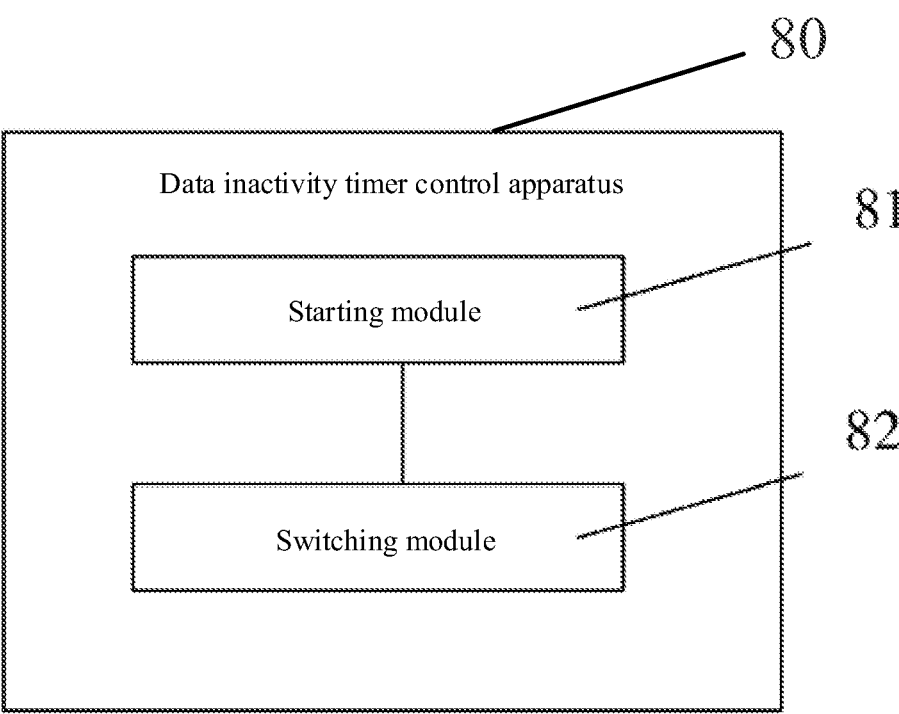
FIG. 7 is a flowchart of a data inactivity timer control method shown according to an example.
FIG. 8 is a schematic diagram of a data inactivity timer control apparatus shown according to an example.

As shown in FIG. 7, an example provides a data inactivity timer control method. In step 61, after starting the data inactivity timer in response to the data inactivity timer starting event that occurs and the terminal is not in the data inactivity timer (DAPS) handover process, the method further includes step 71.

In step 71, in response to that the data inactivity timer starting event occurs and the data inactivity timer exceeds a time-out value, the terminal is switched to a radio resource control (RRC) idle state.

In an example, the terminal releases a radio resource control (RRC) connection based on two modes. First mode: a base station may send a radio resource control (RRC) connection releasing message to the terminal, and the terminal releases the radio resource control (RRC) connection based on the radio resource control (RRC) connection releasing message. Second mode: the base station configures the data inactivity timer for the terminal, and in response to that the data inactivity timer exceeds a time-out value, the terminal releases the radio resource control (RRC) connection. Here, the second mode is introduced for a situation that the terminal may not accurately receive the radio resource control (RRC) connection releasing message. Here, when the radio resource control (RRC) connection releasing message is not received accurately, in response to that the data inactivity timer exceeds a time-out value, the terminal is switched to a radio resource control (RRC) idle state.

In an example, when a media access control (MAC) entity of the terminal receives a media access control (MAC) service data unit (SDU) on a common control channel (CCCH), a dedicated control channel (DCCH) or a dedicated transmission channel (DTCH), or sends the media access control (MAC) service data unit (SDU) on the dedicated transmission channel (DTCH) or the dedicated control channel (DCCH), starting or restarting of the data inactivity timer may be triggered.

In an example, a timing range may be a preset duration. In an example, when a demand for latency of a service is higher than a set latency threshold, the preset duration is set to be larger than a duration threshold. When the demand for latency of the service is lower than the latency threshold, the preset duration is set to be less than the duration threshold.

As shown in FIG. 8, an example provides a data inactivity timer control apparatus 80, performed by a terminal and including a starting module 81.

The starting module 81 is configured to: determine, in response to that a data inactivity timer starting event occurs, an operation for starting a data inactivity timer according to whether the terminal is in a dual active protocol stack (DAPS) handover process.

In an example, the starting module 81 is further configured to:

not start the data inactivity timer or stop running of the data inactivity timer in response to that the data inactivity timer starting event occurs and the terminal is in the dual active protocol stack (DAPS) handover process.

In an example, the starting module 81 is further configured to: not start the data inactivity timer or stop the running of the data inactivity timer by a media access control (MAC) entity of a serving cell in the terminal.

In an example, the starting module 81 is further configured to:

start a prohibit timer of a dual active protocol stack (DAPS) in response to that the terminal enters the dual active protocol stack (DAPS) handover process; and start the data inactivity timer in response to the prohibit timer that exceeds a time-out value.

In an example, the starting module 81 is further configured to:

start the data inactivity timer in response to that the data inactivity timer starting event occurs and the terminal is not in the dual active protocol stack (DAPS) handover process.

In an example, the apparatus 80 further includes a switching module 82, and the switching module 82 is further configured to: switch the terminal to a radio resource control (RRC) idle state in response to the data inactivity timer starting event that occurs and the data inactivity timer exceeds a time-out value.

In an example, the data inactivity timer starting event includes at least one of the following:

a receiving event that a media access control (MAC) entity of the terminal receives a media access control (MAC) service data unit (SDU) on a dedicated transmission channel (DTCH), a dedicated control channel (DCCH) or a common control channel (CCCH); or a sending event that the MAC entity of the terminal sends the media access control (MAC) service data unit (SDU) on the dedicated transmission channel (DTCH) or the dedicated control channel (DCCH).

As for the apparatus in the above example, specific modes for executing operations by all modules are already described in detail in the examples related to the method and will not be described here in detail.

An example of the disclosure provides a communication device, including:

a processor; and a memory configured to store instructions executable by the processor; in which.

The processor is configured to: implement the method applied to any example of the disclosure when running the executable instructions.

The processor may include various types of storage media, and the storage media are non-transitory computer storage media and can continue to memorize stored information after the communication device has a power failure.

The processor may be connected with the memory through a bus and the like and is configured to read an executable program stored on the memory.

An example of the disclosure further provides a computer storage medium. The computer storage medium stores a computer executable program. The executable program, when being executed by a processor, implements the method described in any example of the disclosure.

As for the apparatus in the above example, specific modes for executing operations by all modules are already described in detail in the examples related to the method and will not be described here in detail.

Figure 9:
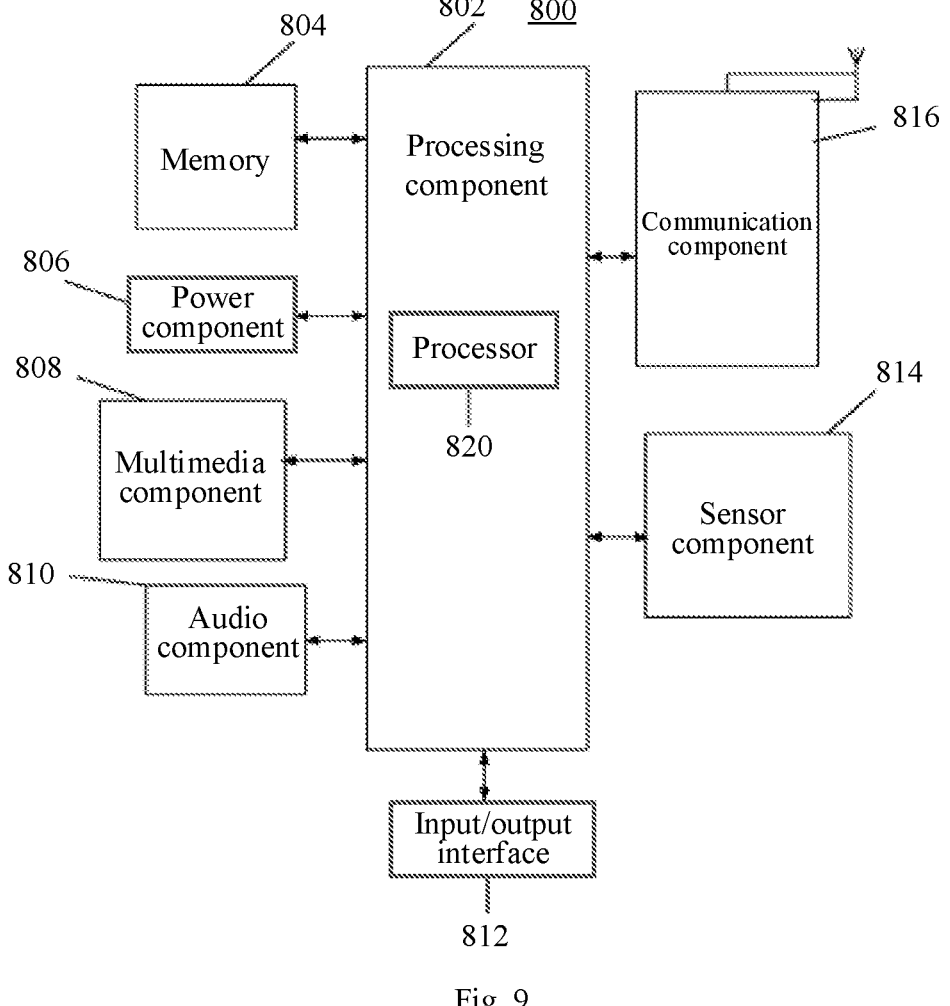
FIG. 9 is a block diagram of user equipment shown according to an example.

FIG. 9 is a block diagram of user equipment (UE) 800 shown according to an example. For example, the user equipment 800 may be a mobile phone, a computer, digital broadcast user equipment, a messaging device, a game console, a tablet device, a medical device, a fitness facility, a personal digital assistant and the like.

Referring to FIG. 9, the user equipment 800 may include one or more components as follows: a processing component 802, a memory 804, a power component 806, a multimedia component 808, an audio component 810, an input/output (I/O) interface 812, a sensor component 814 and a communication component 816.

The processing component 802 generally controls whole operation of the user equipment 800, such as operations related to display, phone call, data communication, camera operation and recording operation. The processing component 802 may include one or more processors 820 for executing instructions so as to complete all or part of steps of the above method. Besides, the processing component 802 may include one or more modules to facilitate interaction between the processing component 802 and the other components. For example, the processing component 802 may include a multimedia module so as to facilitate interaction between the multimedia component 808 and the processing component 802.

The memory 804 is configured to store various types of data so as to support operations on the user equipment 800. Examples of these data include instructions of any application program or method for operation on the user equipment 800, contact person data, telephone directory data, messages, pictures, videos and the like. The memory 804 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 806 provides power for various components of the user equipment 800. The power component 806 may include a power management system, one or more power sources, and other components related to power generation, management and distribution for the user equipment 800.

The multimedia component 808 includes a screen which provides an output interface between the user equipment 800 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors so as to sense touching, swiping and gestures on the touch panel. The touch sensor can not merely sense a boundary of a touching or swiping action, but also detect duration and pressure related to touching or swiping operation. In some examples, the multimedia component 808 includes a front camera and/or a back camera. When the user equipment 800 is in an operation mode, such as a photographing mode or a video mode, the front camera and/or the back camera can receive external multimedia data. Each front camera and each back camera may be a fixed optical lens system or have a focal length and an optical zoom capability.

The audio component 810 is configured to output and/or input an audio signal. For example, the audio component 810 includes a microphone (MIC). When the user equipment 800 is in the operation mode, such as a call mode, a recording mode and a voice recognition mode, the microphone is configured to receive an external audio signal. The received audio signal may be further stored in the memory 804 or sent via the communication component 816. In some examples, the audio component 810 further includes a speaker for outputting the audio signal.

The I/O interface 812 provides an interface between the processing component 802 and a peripheral interface module, and the above peripheral interface module may be a keyboard, a click wheel, buttons and the like. These buttons may include but are not limited to: a home button, a volume button, a start button and a lock button.

The sensor component 814 includes one or more sensors, configured to provide state evaluation of various aspects for the user equipment 800. For example, the sensor component 814 may detect a start/shut-down state of the equipment 800 and relative positioning of the components, for example, the components are a display and a keypad of the user equipment 800. The sensor component 814 may further detect the location change of the user equipment 800 or one component of the user equipment 800, whether there is contact between the user and the user equipment 800, azimuth or speed up/speed down of the user equipment 800 and temperature change of the user equipment 800. The sensor component 814 may include a proximity sensor, configured to detect existence of a nearby object without any physical contact. The sensor component 814 may further include an optical sensor, such as a CMOS or CCD image sensor, for use in an imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the user equipment 800 and other devices. The user equipment 800 may be accessed to a wireless network based on a communication standard, such as WiFi, 2G or 3G, or their combination. In an example, the communication component 816 receives a broadcast signal or related broadcast information from an external broadcast management system via a broadcast channel. In an example, the communication component 816 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In an example, the user equipment 800 may be implemented by one or more than one application specific integrated circuit (ASIC), digital signal processor (DSP), digital signal processing device (DSPD), programmable logic device (PLD), field-programmable gate array (FPGA), controller, micro control unit, microprocessor or other electronic elements for executing the above method.

In an example, a non-transitory computer-readable storage medium including instructions is further provided, such as a memory 804 including the instructions. The above instructions may be executed by a processor 820 of user equipment 800 so as to complete the above method. For example, the non-transitory computer-readable storage medium may be an ROM, a random access memory (RAM), a CD-ROM, a magnetic tape, a floppy disk, an optical data storage device and the like.

Figure 10:
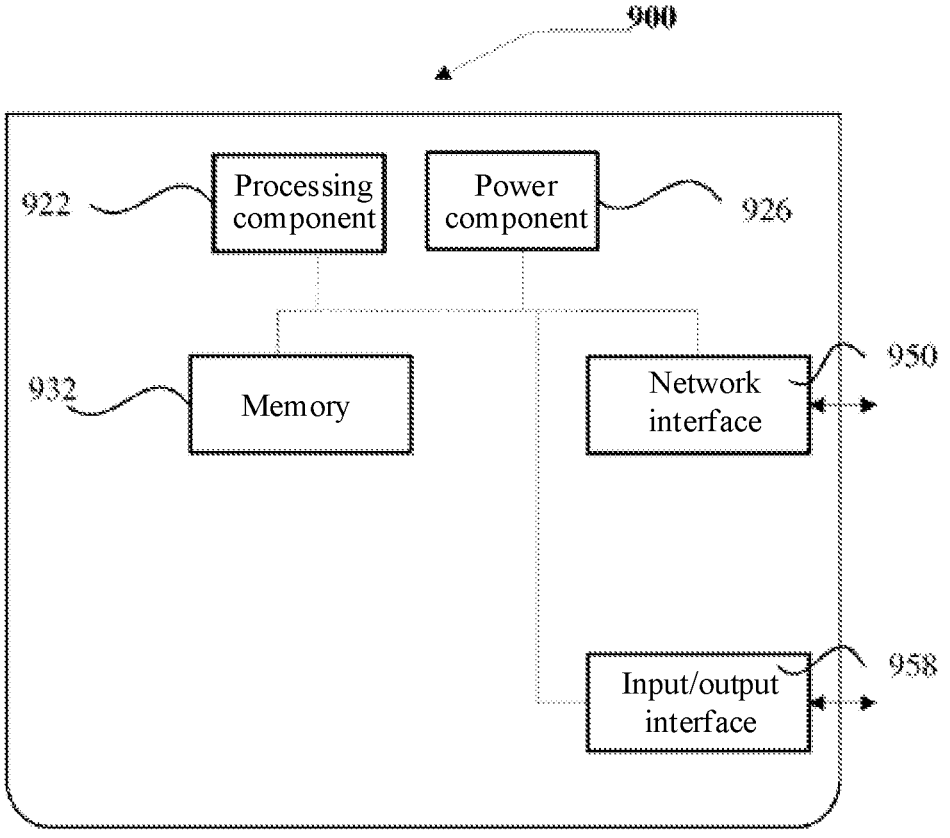
FIG. 10 is a block diagram of a base station shown according to an example.

As shown in FIG. 10, an example of the disclosure shows a structure of a base station. For example, the base station 900 may be provided as a network side device. Referring to FIG. 10, the base station 900 includes a processing component 922 which further includes one or more processors and a memory resource represented by a memory 932, configured to store an instruction capable of being executed by the processing component 922, for example, an application program. The application program stored in the memory 932 may include one or more than one module each of which corresponds to a set of instructions. Besides, the processing component 922 is configured to execute an instruction so as to execute the above method, namely, any above method applied to the base station.

The base station 900 may also include a power component 926 configured to execute power management of the base station 900, a wired or wireless network interface 950 configured to connect the base station 900 to a network, and an input/output (I/O) interface 958. The base station 900 can operate an operating system stored in the memory 932, for example, Windows Server®, Mac OS X™ ®, Unix®, Linux®, FreeBSD™ ®, or the like.

Additional non-limiting embodiments of the disclosure include the following.

According to a first aspect of an example of the disclosure, a data inactivity timer control method is provided and performed by a terminal, and includes:

determining, in response to that a data inactivity timer starting event occurs, an operation for starting a data inactivity timer according to whether the terminal is in a dual active protocol stack (DAPS) handover process.

In an example, determining, in response to the data inactivity timer starting event that occurs, the operation for starting the data inactivity timer according to whether the terminal is in the dual active protocol stack (DAPS) handover process, includes:

not starting the data inactivity timer or stopping running of the data inactivity timer in response to that the data inactivity timer starting event occurs and the terminal is in the DAPS handover process.

In an example, not starting the data inactivity timer or stopping the running of the data inactivity timer, includes:

not starting the data inactivity timer or stopping the running of the data inactivity timer by a media access control (MAC) entity of a serving cell in the terminal.

In an example, the method further includes:

starting a prohibit timer of a DAPS in response to that the terminal enters the DAPS handover process; and after not starting the data inactivity timer or stopping the running of the data inactivity timer in response to that the data inactivity timer starting event occurs and the terminal is in the DAPS handover process, the method further includes:

starting the data inactivity timer in response to that the prohibit timer exceeds a time-out value.

In an example, determining, in response to the data inactivity timer starting event that occurs, the operation for starting the data inactivity timer according to whether the terminal is in the dual active protocol stack (DAPS) handover process, includes:

starting the data inactivity timer in response to the data inactivity timer starting event that occurs and the terminal is not in the DAPS handover process.

In an example, after starting the data inactivity timer in response to the data inactivity timer starting event that occurs and the terminal is not in the DAPS handover process, the method further includes:

switching the terminal to a radio resource control (RRC) idle state in response to the data inactivity timer starting event that occurs and the data inactivity timer exceeds a time-out value.

In an example, the data inactivity timer starting event includes at least one of the following:

a receiving event that a media access control (MAC) entity of the terminal receives a MAC service data unit (SDU) on a dedicated transmission channel (DTCH), a dedicated control channel (DCCH) or a common control channel (CCCH); or a sending event that the MAC entity of the terminal sends the MAC service data unit (SDU) on the dedicated transmission channel (DTCH) or the dedicated control channel (DCCH).

According to a second aspect of an example of the disclosure, a data inactivity timer control apparatus is provided and performed by a terminal, and includes a starting module.

The starting module is configured to: determine, in response to a data inactivity timer starting event that occurs, an operation for starting a data inactivity timer according to whether the terminal is in a dual active protocol stack (DAPS) handover process.

In an example, the starting module is further configured to:

not start the data inactivity timer or stop running of the data inactivity timer in response to that the data inactivity timer starting event occurs and the terminal is in the DAPS handover process.

In an example, the starting module is further configured to: not start the data inactivity timer or stop the running of the data inactivity timer by a media access control (MAC) entity of a serving cell in the terminal.

In an example, the starting module is further configured to:

start a prohibit timer of a DAPS in response to the terminal that enters the DAPS handover process; and start the data inactivity timer in response to that the prohibit timer exceeds a time-out value.

In an example, the starting module is further configured to:

start the data inactivity timer in response to the data inactivity timer starting event that occurs and the terminal is not in the DAPS handover process.

In an example, the apparatus further includes a switching module, and the switching module is further configured to: switch the terminal to a radio resource control (RRC) idle state in response to the data inactivity timer starting event that occurs and the data inactivity timer exceeds a time-out value.

In an example, the data inactivity timer starting event includes at least one of the following:

a receiving event that a media access control (MAC) entity of the terminal receives a MAC service data unit (SDU) on a dedicated transmission channel (DTCH), a dedicated control channel (DCCH) or a common control channel (CCCH); or a sending event that the MAC entity of the terminal sends the MAC service data unit (SDU) on the dedicated transmission channel (DTCH) or the dedicated control channel (DCCH).

According to a third aspect of an example of the disclosure, a communication device is provided and includes:

a processor; and a memory configured to store instructions executable by the processor; in which the processor is configured to: implement the method described in any example of the disclosure when running the executable instructions.

According to a fourth aspect of an example of the disclosure, a computer storage medium is provided and stores a computer executable program, and the executable program, when being executed by a processor, implements the method described in any example of the disclosure.

Those skilled in the art will easily figure out other implementation solutions of the disclosure after considering the specification and practicing the disclosure disclosed here. The disclosure intends to cover any transformation, purpose or adaptive change of the disclosure which conforms to a general principle of the disclosure and includes common general knowledge or conventional technical means which are not disclosed by the disclosure in the technical field. The specification and the examples are merely regarded as examples, and the true scope and spirit of the disclosure are indicated by the following claims.

It needs to be understood that the disclosure is not limited to an accurate structure described above and shown in the accompanying drawings, and various modifications and changes can be made without departing from its scope.

What is claimed is:

1. A method for data inactivity timer control, performed by a terminal and comprising:

determining an operation for starting a data inactivity timer according to whether the terminal is in a dual active protocol stack (DAPS) handover process in response to a data inactivity timer starting event occurring, wherein the determining the operation for starting the data inactivity timer according to whether the terminal is in the dual active protocol stack (DAPS) handover process in response to the data inactivity timer starting event occurring, comprises:

in response to that the data inactivity timer starting event occurs and the terminal is in the DAPS handover process, not starting the data inactivity timer or stopping running of the data inactivity timer.

2. The method according to claim 1, wherein not starting the data inactivity timer or stopping the running of the data inactivity timer, comprises:

not starting the data inactivity timer or stopping the running of the data inactivity timer by a media access control (MAC) entity of a serving cell in the terminal.

3. The method according to claim 1, further comprising:

starting a prohibit timer of the DAPS in response to that the terminal enters the DAPS handover process; and starting the data inactivity timer in response to that the prohibit timer exceeds a time-out value.

4. The method according to claim 1, wherein determining the operation for starting the data inactivity timer according to whether the terminal is in the dual active protocol stack (DAPS) handover process in response to that the data inactivity timer starting event occurs, comprises:

starting the data inactivity timer in response to that the data inactivity timer starting event occurs and the terminal is not in the DAPS handover process.

5. The method according to claim 4, further comprising:

switching the terminal to a radio resource control (RRC) idle state in response to that the data inactivity timer starting event occurs and the data inactivity timer exceeds a time-out value.

6. The method according to claim 1, wherein the data inactivity timer starting event comprises at least one of following:

a receiving event that a media access control (MAC) entity of the terminal receives a MAC service data unit (SDU) on a dedicated transmission channel (DTCH), a dedicated control channel (DCCH) or a common control channel (CCCH); or a sending event that the MAC entity of the terminal sends the MAC service data unit (SDU) on the dedicated transmission channel (DTCH) or the dedicated control channel (DCCH).

7. A communication device, comprising:

an antenna;

a memory; and a processor, connected with the antenna and the memory respectively, wherein the processor is configured to control transceiving of the antenna and determine an operation for starting a data inactivity timer according to whether a terminal is in a dual active protocol stack (DAPS) handover process in response to a data inactivity timer starting event occurring, wherein the processor is configured to:

in response to the data inactivity timer starting event occurring and the terminal is in the DAPS handover process, not start the data inactivity timer or stop running of the data inactivity timer.

8. The communication device according to claim 7, wherein the processor is configured to:

not start the data inactivity timer or stop the running of the data inactivity timer by a media access control (MAC) entity of a serving cell in the terminal.

9. The communication device according to claim 7, wherein the processor is further configured to:

start a prohibit timer of the DAPS in response to that the terminal enters the DAPS handover process; and start the data inactivity timer in response to that the prohibit timer exceeds a time-out value.

10. The communication device according to claim 7, wherein the processor is configured to:

start the data inactivity timer in response to that the data inactivity timer starting event occurs and the terminal is not in the DAPS handover process.

11. The communication device according to claim 10, wherein the processor is further configured to:

switch the terminal to a radio resource control (RRC) idle state in response to that the data inactivity timer starting event occurs and the data inactivity timer exceeds a time-out value.

12. The communication device according to claim 7, wherein the data inactivity timer starting event comprises at least one of following:

a receiving event that a media access control (MAC) entity of the terminal receives a MAC service data unit (SDU) on a dedicated transmission channel (DTCH), a dedicated control channel (DCCH) or a common control channel (CCCH); or a sending event that the MAC entity of the terminal sends the MAC service data unit (SDU) on the dedicated transmission channel (DTCH) or the dedicated control channel (DCCH).

13. A non-transitory computer storage medium, storing computer executable instructions, wherein when the computer executable instructions, are executed by a processor, the processor is caused to determine an operation for starting a data inactivity timer according to whether a terminal is in a dual active protocol stack (DAPS) handover process in response to a data inactivity timer starting event occurring, wherein the processor is caused to:

in response to the data inactivity timer starting event occurring and the terminal is in the DAPS handover process, not start the data inactivity timer or stop running of the data inactivity timer.

14. The non-transitory computer storage medium according to claim 13, wherein the processor is caused to:

not start the data inactivity timer or stop the running of the data inactivity timer by a media access control (MAC) entity of a serving cell in the terminal.

15. The non-transitory computer storage medium according to claim 13, wherein the processor is further caused to:

start a prohibit timer of the DAPS in response to that the terminal enters the DAPS handover process; and start the data inactivity timer in response to that the prohibit timer exceeds a time-out value.

16. The non-transitory computer storage medium according to claim 13, wherein the processor is caused to:

start the data inactivity timer in response to that the data inactivity timer starting event occurs and the terminal is not in the DAPS handover process.

17. The non-transitory computer storage medium according to claim 16, wherein the processor is further caused to:

switch the terminal to a radio resource control (RRC) idle state in response to that the data inactivity timer starting event occurs and the data inactivity timer exceeds a time-out value.

\* \* \* \* \*